(12) United States Patent
Azizi et al.

(10) Patent No.: US 10,034,240 B2
(45) Date of Patent: *Jul. 24, 2018

(54) WIRELESS DEVICE, METHOD, AND COMPUTER READABLE MEDIA FOR TRANSMITTING AND RECEIVING BEACON FRAMES

(71) Applicant: Intel IP Corporation, Santa Clara, CA (US)

(72) Inventors: Shahrnaz Azizi, Cupertino, CA (US); Eldad Perahia, Portland, OR (US); Guoqing C. Li, Portland, OR (US); Robert J. Stacey, Portland, OR (US); Thomas J. Kenney, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 360 days.

This patent is subject to a terminal disclaimer.

(21) Appl. No.: 14/572,048

(22) Filed: Dec. 16, 2014

(65) Prior Publication Data

US 2016/0050622 A1    Feb. 18, 2016

Related U.S. Application Data

(60) Provisional application No. 62/037,787, filed on Aug. 15, 2014.

(51) Int. Cl.
*H04L 12/50* (2006.01)
*H04W 52/02* (2009.01)
(Continued)

(52) U.S. Cl.
CPC ....... *H04W 52/0216* (2013.01); *H04W 48/12* (2013.01); *H04W 84/12* (2013.01);
(Continued)

(58) Field of Classification Search
CPC .......... H04W 52/0216; H04W 48/12
(Continued)

(56) References Cited

U.S. PATENT DOCUMENTS

| 2006/0050742 A1 | 3/2006 | Grandhi et al. |
| 2014/0204827 A1 | 7/2014 | Grandhi et al. |

(Continued)

FOREIGN PATENT DOCUMENTS

| TW | 201607283 A | 2/2016 |
| WO | 2013174159 | 11/2013 |

(Continued)

OTHER PUBLICATIONS

"International Application Serial No. PCT/US2015/036203, International Preliminary Report on Patentability dated Mar. 2, 2017", 10 pgs.

(Continued)

*Primary Examiner* — Dang Ton
(74) *Attorney, Agent, or Firm* — Schwegman Lundberg & Woessner, P.A.

(57) ABSTRACT

Wireless devices, methods, and computer readable media for transmitting and receiving beacon frames are disclosed. A HEW device may include circuitry configured to: operate in accordance with OFDMA on a plurality of subchannels and a primary channel, and transmit a first beacon on the primary channel to one or more legacy devices. The circuitry may be further configured to transmit a second beacon on the plurality of subchannels to one or more HEW devices. The first beacon may be an 802.11 legacy beacon and the second beacon may be a HEW beacon. A HEW device may include circuitry configured to: tune to an assigned subchannel; and receive a HEW beacon on the assigned subchannel. The circuitry may be configured to: enter a power saving mode; leave the power saving mode; and receive another HEW (Continued)

502

500 beacon on the assigned subchannel to synchronize the HEW device with the AP.

19 Claims, 5 Drawing Sheets

(51) Int. Cl.
*H04W 48/12* (2009.01)
*H04W 84/12* (2009.01)

(52) U.S. Cl.
CPC .......... *Y02D 70/00* (2018.01); *Y02D 70/1226* (2018.01); *Y02D 70/1262* (2018.01); *Y02D 70/142* (2018.01); *Y02D 70/144* (2018.01); *Y02D 70/146* (2018.01); *Y02D 70/26* (2018.01)

(58) Field of Classification Search
USPC .......................................... 370/311, 428, 389
See application file for complete search history.

(56) References Cited

U.S. PATENT DOCUMENTS

| | | | |
|---|---|---|---|
| 2015/0078354 A1 | 3/2015 | Chen | |
| 2015/0319599 A1* | 11/2015 | Seok ...................... | H04W 48/16 370/338 |
| 2016/0020885 A1* | 1/2016 | Li ......................... | H04L 1/1854 370/329 |
| 2016/0050622 A1* | 2/2016 | Azizi ................ | H04W 52/0216 370/311 |
| 2016/0056943 A1* | 2/2016 | Stacey .................. | H04L 5/0091 370/338 |
| 2016/0286485 A1* | 9/2016 | Li ...................... | H04W 52/0216 |

FOREIGN PATENT DOCUMENTS

| | | |
|---|---|---|
| WO | WO-2014110397 A1 | 7/2014 |
| WO | WO-2014123349 A1 | 8/2014 |
| WO | WO-2014123357 A1 | 8/2014 |
| WO | WO-2016025073 A1 | 2/2016 |

OTHER PUBLICATIONS

"International Application Serial No. PCT/US2015/036203, International Search Report dated Oct. 28, 2016", 4 pgs.

"International Application Serial No. PCT/US2015/036203, Written Opinion dated Oct. 28, 2016", 8 pgs.

"Taiwanese Application Serial No. 104121730, Office Action dated Nov. 17, 2016", w/English Claims, 17 pgs.

"Update on HEW Channel Model", Intel, IEEE 802.11-13/1146r0, [Online] Retrieved from the internet: <https://mentor.ieee.org/802.11/dcn/13/11-13-1146-00-0hew-update-on-hew-chan nel-model.pptx>, (Sep. 16, 2013).

"Taiwanese Application Serial No. 104121730, Office Action dated Aug. 21, 2017", (W/ Partial English Translation), 6 pgs.

"Taiwanese Application Serial No. 104121730, Response Filed May 15, 2017 to Office Action dated Nov. 17, 2016", (W/ English Claims), 50 pgs.

"Taiwanese Application Serial No. 104121730, Response Filed Oct. 26, 2017 to Office Action dated Aug. 26, 2017", (W/ English Claims), 50 pgs.

"European Application Serial No. 15832301.4, Extended European Search Report dated Mar. 14, 2018", 10 pgs.

* cited by examiner

WIRELESS DEVICE, METHOD, AND COMPUTER READABLE MEDIA FOR TRANSMITTING AND RECEIVING BEACON FRAMES

PRIORITY CLAIM

This application claims the benefit of priority under 35 USC 119(e) to U.S. Provisional Patent Application Ser. No. 62/037,787, filed Aug. 15, 2014 which is incorporated herein by reference in its entirety.

TECHNICAL FIELD

Embodiments pertain to wireless communications. Some embodiments relate to beacon frames and policies in wireless local-area networks (WLANs) for transmitting and receiving beacon frames, some embodiments relate to WLANs operating in accordance with orthogonal frequency division multiple access (OFDMA) with scheduled transmission periods, and some embodiments relate to 802.11, and some to 802.11ax.

BACKGROUND

One issue with communicating data over a wireless network is transmitting and receiving beacon frames. Often stations (STA) need to receive beacon frames from access points (APs) to communicate properly with the APs. A STA may consume power in tuning to a channel to receive a beacon and synchronize with an AP.

Another issue with communicating data over a wireless network is that often more than one standard may be in use in a wireless local-area network (WLAN). For example, Institute of Electronic and Electrical Engineers (IEEE) 802.11ax, referred to as high efficiency wireless local-area networks (WLAN) (HEW) may need to be used with legacy versions of 802.11.

Thus, there are general needs for systems and methods that allow access points to transmit beacon frames and stations to receive beacon frames. There are also general needs for systems and methods that allow HEW devices to coexist with legacy devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
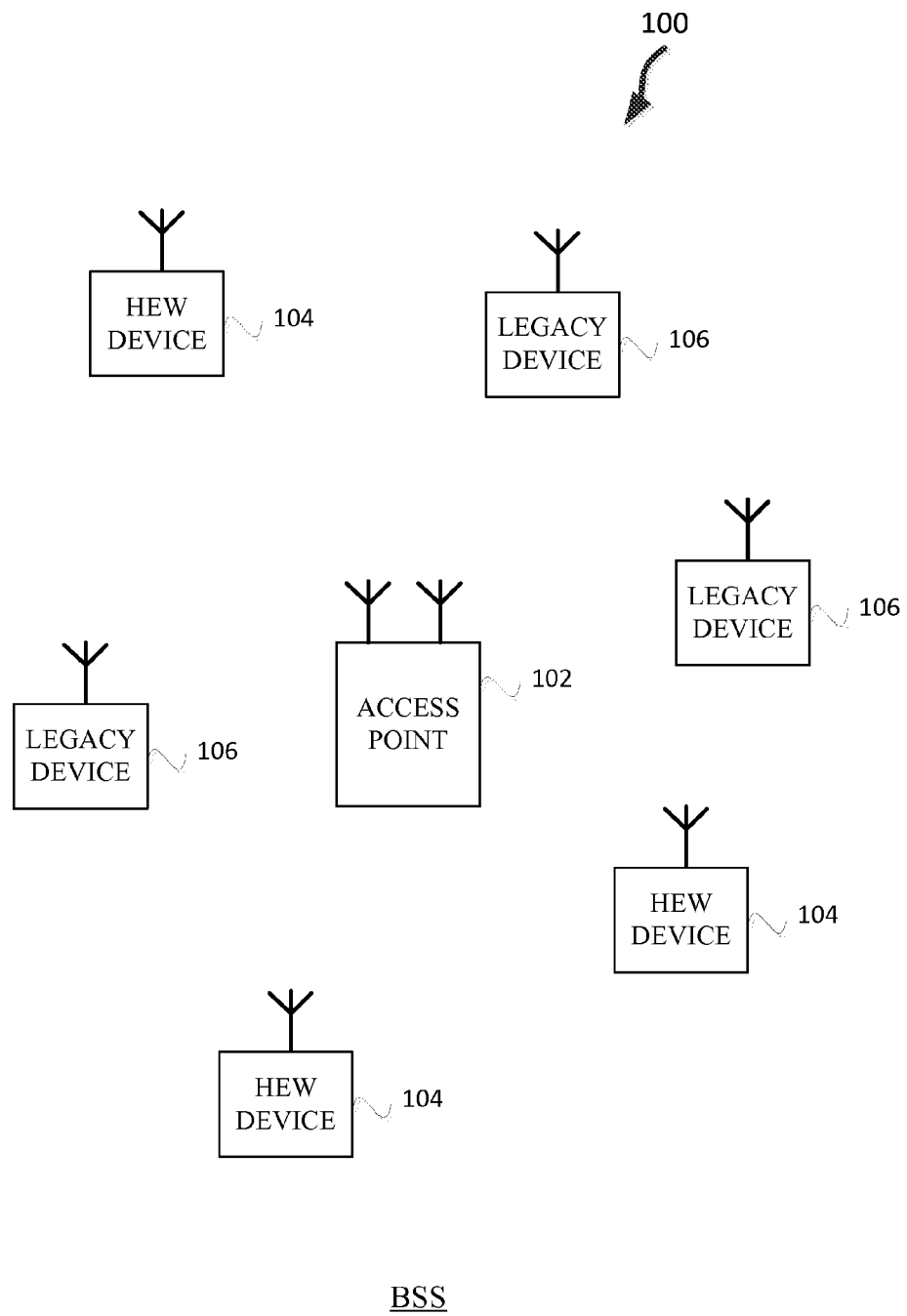
FIG. 1 illustrates a wireless network in accordance with some embodiments.

FIG. 1 illustrates a wireless network in accordance with some embodiments. The wireless local-area network (WLAN) may comprise a basis service set (BSS) 100 that may include an access point (AP) 102, a plurality of high-efficiency wireless (HEW) (e.g., IEEE 802.11ax) devices 104 and a plurality of legacy (e.g., IEEE 802.11n/ac) devices 106. In example embodiments, a HEW device 104 may be called a HE device, HE Wi-Fi device, wireless device, or a wireless communications device.

The AP 102 may be an access point (AP) using the 802.11 protocol to transmit and receive. The AP 102 may be a base station. The AP 102 may use other communications protocols as well as the 802.11 protocol. The 802.11 protocol may be 802.11ax. The 802.11 protocol may include using Orthogonal Frequency-Division Multiple Access (OFDMA), time division multiple access (TDMA), and/or code division multiple access (CDMA). The 802.11 may include a multiple access technique which may be a space-division multiple access (SDMA) technique such as multi-user (MU) multiple-input and multiple-output (MIMO) (MU-MIMO).

The HEW devices 104 may operate in accordance with 802.11ax or another standard of 802.11. The legacy devices 106 may operate in accordance in accordance with one or more of 802.11 a/b/g/n/ac, or another legacy wireless communication standard.

The HEW devices 104 may be wireless transmit and receive devices such as cellular telephone, handheld wireless device, wireless glasses, wireless watch, wireless personal device, tablet, or another device that may be transmitting and receiving using the 802.11 protocol such as 802.11ax or another wireless protocol.

The BSS 100 may operate on a primary channel and zero or more secondary channels or sub-channels. The BSS 100 may include one or more APs 102. In accordance with embodiments, the AP 102 may communicate with one or more of the HEW devices 104 on one or more of the secondary channels or sub-channels or the primary channel. In example embodiments, the AP 102 communicates with the legacy devices 106 on the primary channel. In example embodiments, the AP 102 may be configured to communicate concurrently with one or more of the HEW devices 104 on one or more of the secondary channels and a legacy device 106 utilizing only the primary channel and not utilizing any of the secondary channels.

The AP 102 may communicate with legacy devices 106 in accordance with legacy IEEE 802.11 communication techniques. In example embodiments, the AP 102 may also be configured to communicate with HEW devices 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth and the bandwidth may be one of 20 MHz, 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.5 MHz, 5 MHz and 10 MHz or a combination thereof may also be used. A HEW frame may be configured for transmitting a number of spatial streams.

In other embodiments, the AP 102, HEW device 104, and/or legacy device 106 may also implement different technologies such as CDMA2000, CDMA2000 1×, CDMA2000 EV-DO, Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In an orthogonal frequency division multiplexing (OFDM) system (e.g., 802.11ax), an associated HEW device 104 may operate on different sub-channels, which may be 20 MHz, of the BSS 100 (that can operate for example at 80 MHz). In OFDMA multiple HEW devices 104 and/or legacy devices 106 may operate at the same time on different sub-channels. The HEW device 104 may enter a power save and upon coming out of power save mode, the HEW device 104 may need to re-synchronize with BSS 100 by receiving a beacon. If a beacon is transmitted only on the primary channel, then HEW device 104 needs to move and tune to the primary channel upon waking up to be able to receive beacons. Then the HEW device 104 needs to re-tune back to its operating subchannels, which may be 20 MHz, or it has to follow a handshake procedure to let AP 102 know of a new operating subchannel. The HEW device 104 may risk losing some frames during the channel switch, in example embodiments.

In example embodiments, the HEW device 104 is configured to transmit and receive beacon frames according to one or more of the embodiments disclosed herein in conjunction with FIGS. 1-6.

Some embodiments relate to high-efficiency wireless communications including high-efficiency WLAN and high-efficiency wireless (HEW) communications. In accordance with some IEEE 802.11ax (High-Efficiency WLAN (HEW)) embodiments, an AP 102 may operate as a master station which may be arranged to contend for a wireless medium (e.g., during a contention period) to receive exclusive control of the medium for an HEW control period (i.e., a transmission opportunity (TXOP)). The AP 102 may transmit an HEW master-sync transmission at the beginning of the HEW control period. During the HEW control period, HEW devices 104 may communicate with the AP 102 in accordance with a non-contention based multiple access technique. This is unlike conventional WLAN communications in which devices communicate in accordance with a contention-based communication technique, rather than a multiple access technique. During the HEW control period, the AP 102 may communicate with HEW devices 104 using one or more HEW frames. During the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station may also communicate with legacy stations in accordance with legacy IEEE 802.11 communication techniques. In some embodiments, the master station may also be configurable to communicate with HEW devices 104 outside the HEW control period in accordance with legacy IEEE 802.11 communication techniques, although this is not a requirement.

Figure 2:
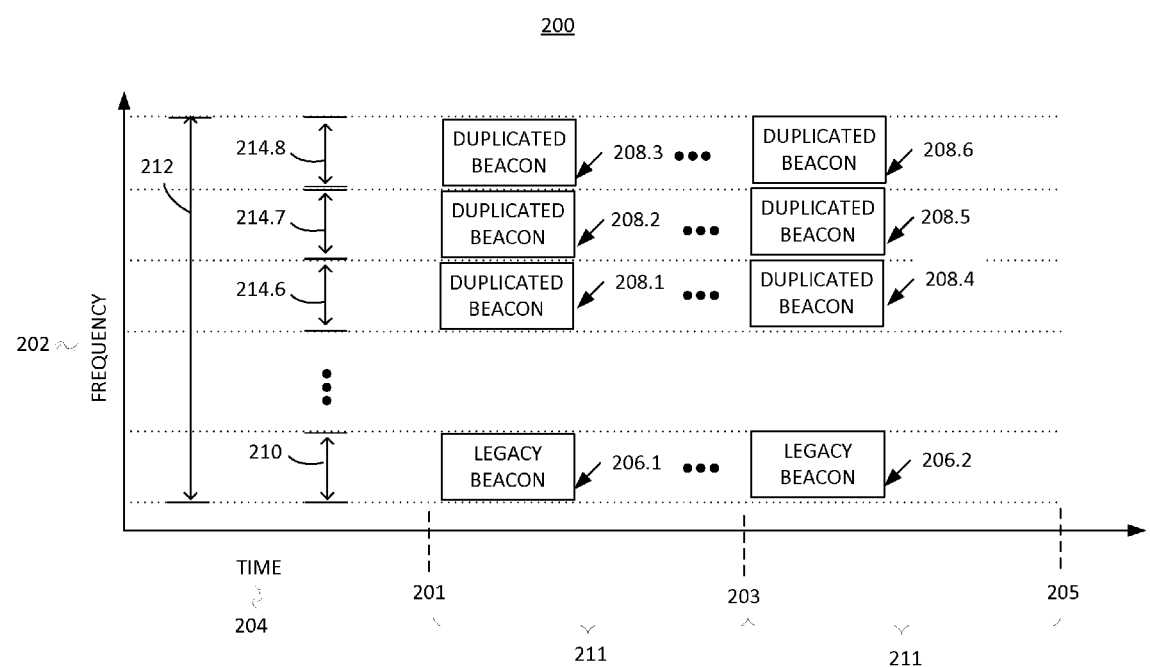
FIG. 2 illustrates transmission of a beacon according to example embodiments.

FIG. 2 illustrates transmission of a beacon according to example embodiments. Illustrated in FIG. 2 are frequency 202 along the vertical axis and time 204 along the horizontal axis. The frequency 202 may have an operational bandwidth 212, which may be divided into a number of subchannels 210, 214. One of the subchannels 210 may be a primary subchannel 210. In example embodiments, the subchannels 210, 214 may be 20 MHz and the operational bandwidth 212 may be 80 MHz, 160 MHz, or 320 MHz. The legacy beacon 206 may be a beacon frame as described in one or more wireless standards such as 802.11. The duplicated beacons 208 may be duplicated versions of the legacy beacon 206 that may have one or more fields changed based on being transmitted on a different subchannel 214 than the legacy beacon 206.

An AP 102 may transmit the legacy beacons 206 on the primary channel 210 and the duplicated beacons 208 on each of the subchannels 214. Each of the legacy beacons 206 and duplicated beacons 208 may include system information for the HEW devices 104 and legacy devices 106. The AP 102 may transmit the legacy beacons 206 and the duplicated beacons 208 with a periodicity. For example, the AP 102 may transmit the legacy beacons 206 and the duplicated beacons 208 every period of time 211. For example, at time 201, then time 203, and then time 205 (transmission not illustrated for time 205).

In example embodiments, the duplication of the legacy beacon 206 and transmission of the duplicated beacons 208 on the subchannels 214 enables an associated HEW device 104 to continue operating in an assigned subchannel (e.g., 20 MHZ) while entering and exiting power save modes without a need to re-tune to the primary channel 210 to receive the legacy beacon 206 to synchronize with the AP 102. The HEW device 104 may have been assigned a subchannel 214 to operate on by the AP 102.

In example embodiments, there could be legacy devices 106 using the subchannels 214. The duplicated beacon 208 may appear to legacy devices 106 as the legacy beacon 206 on the primary channel 210. The legacy beacon 206 and duplicated beacon 208 carry an information element (IE) in which the frequency 202 of the primary channel 210 is specified; however, some legacy device 106 (in particular, old implementations of 802.11a devices) may not process that information element, and instead assume the primary subchannel 210 is the subchannel 214 on which the physical reception of the duplicated beacon 208 occurs. Some legacy devices 106 such as 802.11n/ac devices obtain the primary channel 210 frequency using the information from the high throughput (HT) operation IE of the received beacon 206, 208.

Thus, the AP 102 may need to manage legacy devices 106 and traffic on all the subchannels 210, 214. In example embodiments, the AP 102 may manage the legacy devices 106 by permitting them to operate on whichever subchannel 210, 214 the legacy device 106 receives a legacy beacon 206 or duplicated beacon 208. In transmitting over more than one subchannel 214, 210 the AP 102 may transmit with less power on each subchannel 214, 210 than if the AP 102 only transmitted on one subchannel 214, 210, since the overall power the AP 102 transmits with is limited by standards.

Figure 3:
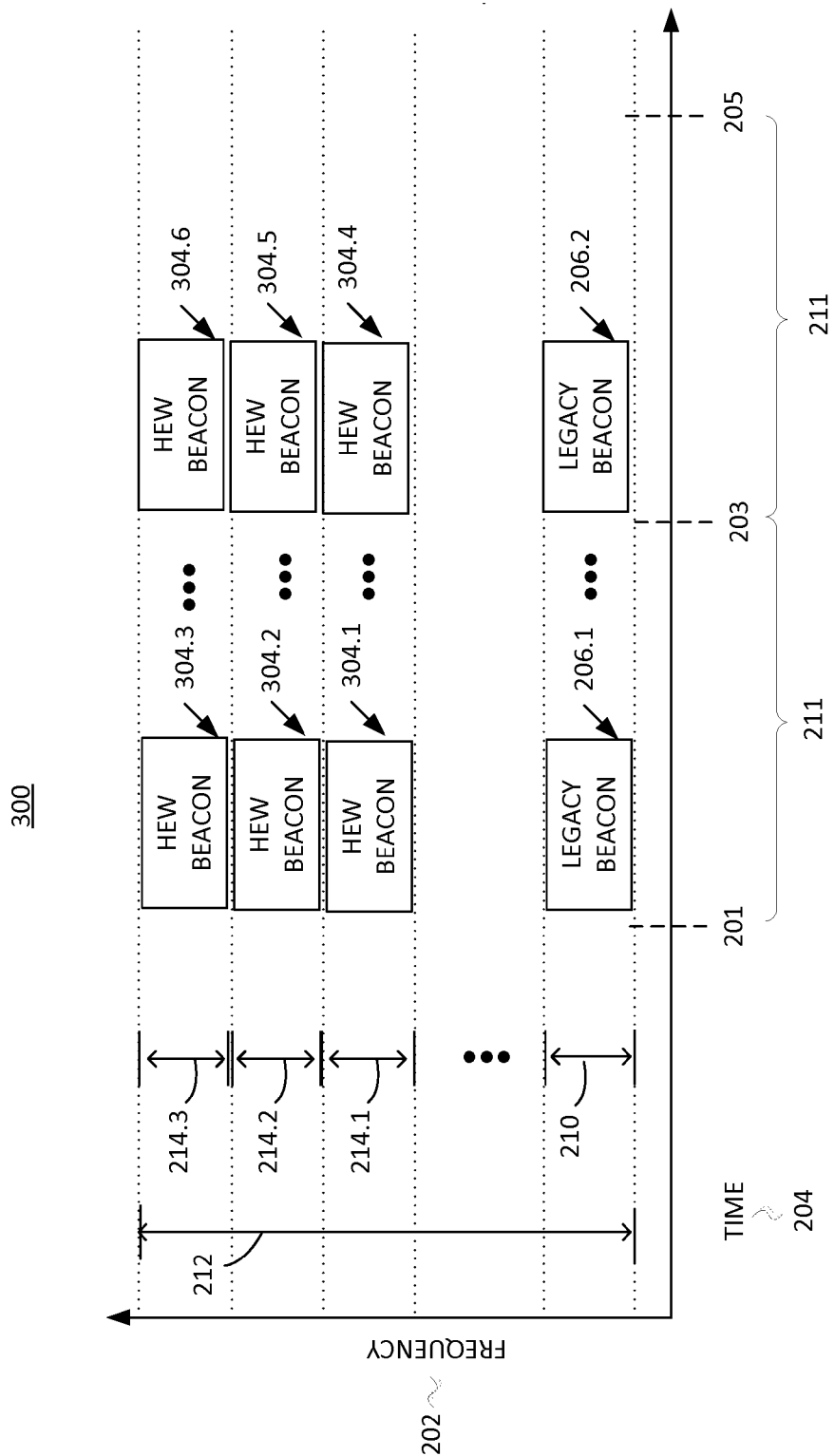
FIG. 3 illustrates transmission of legacy beacons on a primary subchannel and HEW beacons on other subchannels, according to example embodiments.

FIG. 3 illustrates transmission of legacy beacons 206 on a primary subchannel 210 and HEW beacons 304 on other subchannels 214, according to example embodiments. Illustrated in FIG. 3 are frequency 202 along the vertical axis and time 204 along the horizontal axis. The frequency 202 may have an operational bandwidth 212, which may be divided into a number of subchannels 210, 214. One of the subchannels 210 may be a primary subchannel 210. In example embodiments, the subchannels 210, 214 may be 20 MHz and the operational bandwidth 212 may be 80 MHz, 160 MHz, or 320 MHz. The legacy beacon 206 may be a beacon frame as described in one or more wireless standards such as 802.11. The HEW beacons 304 may be a format for HEW device 104, which may be a new format. In example embodiments, some legacy devices 106 may not be able to interpret the HEW beacons 304. The HEW devices 104 can interpret the HEW beacons 304.

The AP 102 may transmit a legacy beacon 206 on the primary channel 210 for the legacy devices 106 and HEW beacons 304 on the subchannels 214 for the HEW devices 104. In example embodiments, HEW device 104 and legacy devices 106 can receive legacy beacons 206 on the primary channel; however, only the HEW devices 104 would be able to receive and interpret the HEW beacons 304 on secondary channels 214.

Thus, example embodiments have the advantage of avoiding the situation where a legacy device 106 may determine the primary channel 210 is incorrectly a subchannel 214 due to the legacy device 106 receiving a duplicated legacy beacon 208 (FIG. 2) on a subchannel 214.

In example embodiments, the format of the HEW beacon 304 has a new Media Access Control (MAC) layer format. The HEW beacon 304 may have a new physical layer format. In example embodiments, the HEW beacon 304 is part of OFDMA transmission with new data, pilot, and null subcarriers allocations. For example, the number of null subcarriers at band edges of the secondary 20 MHz subchannels could be different than those in the format of the legacy beacon 206.

In example embodiments, different bandwidths may be used to transmit the HEW beacons 304. For example, higher bandwidths that are multiples of 20 MHz such as legacy high-efficiency wireless local-area network bandwidths of operation 40, 80, 160, or 320 MHz may be used. For example, a HEW beacon 304 may be transmitted over subchannels 214.1 and 214.2. The bandwidths may be consistent with signaling for HEW OFDMA operation, which may be 20 MHz. In example embodiments, the HEW devices 104 and legacy devices 106 may coexist, and the AP 102 can manage the primary channel 210 of the legacy devices 106 independently of OFDMA operation with HEW devices 104 on the subchannels 214.

The AP 102 may transmit the legacy beacons 206 and the HEW beacons 304 with a periodicity. For example, the AP 102 may transmit the legacy beacons 206 and the HEW beacons 304 every period of time 211. For example, at time 201, then time 203, and then time 205 (transmission not illustrated for time 205).

Figure 4:
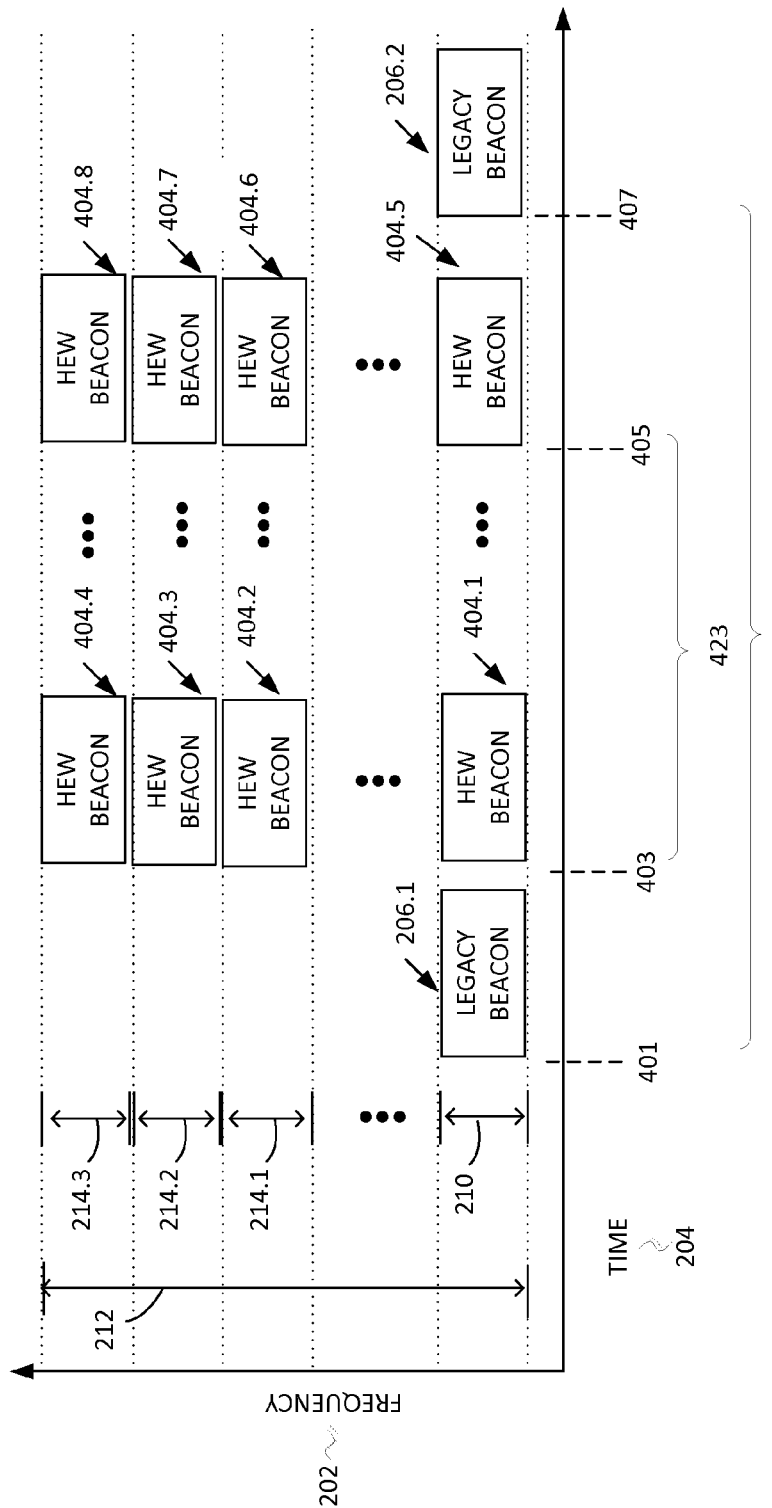
FIG. 4 illustrates transmission of legacy beacons on a primary subchannel and HEW beacons on other subchannels and the primary subchannel, according to example embodiments.

FIG. 4 illustrates transmission of legacy beacons 206 on a primary subchannel 210 and HEW beacons 404 on other subchannels 214 and the primary subchannel 210, according to example embodiments. Illustrated in FIG. 4 are frequency 202 along the vertical axis and time 204 along the horizontal axis. The frequency 202 may have an operational bandwidth 212, which may be divided into a number of subchannels 210, 214. One of the subchannels 210 may be a primary subchannel 210. In example embodiments, the subchannels 210, 214 may be 20 MHz and the operational bandwidth 212 may be 80 MHz, 160 MHz, or 320 MHz. The legacy beacon 206 may be a beacon frame as described in one or more wireless standards such as 802.11. The HEW beacons 404 may be a format for HEW device 104, which may be a new format. In example embodiments, some legacy devices 106 may not be able to interpret the HEW beacons 404. The HEW devices 104 can interpret the HEW beacons 404.

In example embodiments, the AP 102 may transmit the legacy beacon 206 on the primary subchannel 210 and transmit the HEW beacon 404 on the subchannels 214, and, optionally, on the primary channel 210. In example embodiments, the HEW beacons 404 may be transmitted based on an allocation the AP 102 sends to the HEW devices 104. For example, a HEW beacon 404 may be 1.25 MHz, 2.5 MHz, 5 MHz, 10 MHz, 20 MHz, 40 MHz, 60 MHz, 80 MHz, 100 MHz, 120 MHz, 140 MHz, 160 MHz, or another appropriate bandwidth. Moreover, in example embodiments, the AP 102 may only send HEW beacons 404 on subchannels 214 where HEW devices 104 are operating.

In example embodiments, the period(s) and format of HEW beacons 304, 404 and legacy beacons 206 can be configured independently to optimize overall system throughput and performance. For example, the legacy beacons 206 may be transmitted at time 401 and time 407, for a period 421 of time 204. The legacy beacons 206 may then be transmitted every period 421 of time 204. In example embodiments, the legacy beacons 206 may be transmitted either more or less frequently, and may not be transmitted with a regular periodicity. The HEW beacons 404 may be transmitted at time 403 and time 405 for a period 423 of time 204. The HEW beacons 404 may be transmitted more or less often, and may not be transmitted with a regular periodicity. Moreover, the HEW beacons 404 may be transmitted at different times 204 depending on which of the subchannel 214 and/or primary channel 210 the HEW beacon 404 is transmitted on.

Example embodiments provide the technical effect that the HEW device 104 does not need to tune to the primary channel 210 to synchronize with the AP 102 since the HEW device 102 may receive a beacon on the subchannel 214 the HEW device 104 is currently tuned to. This may reduce the power consumed by the HEW device 104, and further the HEW device 104 may not lose packets sent to the HEW device 104 while the HEW device 104 is tuning to the primary channel 210 to receive a beacon 404.

Example embodiments have the technical effect of having separate beacons on the primary channel 210, one for legacy devices 106 and one for HEW devices 104, by configuring HEW beacons 404 so that they can't be interpreted by the legacy devices 106. Example embodiments of HEW beacons 404 that cannot be interpreted by legacy devices 106 have the technical effect of being able to send beacon frames to HEW devices 104 on subchannels 214 without legacy devices 106 tuned to a subchannel 214 assuming the subchannel 214 is the primary channel 210.

Figure 5:
FIG. 5 illustrates a HEW beacon according to example embodiments.

FIG. 5 illustrates a HEW beacon 500 according to example embodiments. The HEW beacon 500 may be a format for HEW device 104, which may be a new format. The HEW beacon 500 may include a capabilities element 502 for high-efficiency (HE) operation that may include parameters such as an indication of the number of subchannels. In example embodiments, some legacy devices 106 may not be able to interpret the HEW beacons 500. The HEW devices 104 can interpret the HEW beacons 500. In example embodiments, the format of the HEW beacon 500 has a new MAC layer format. The HEW beacon 500 may have a new physical layer format. In example embodiments, the HEW beacon 500 is part of OFDMA transmission with new data, pilot, and null subcarriers allocations. For example, the number of null subcarriers at band edges of the secondary 20 MHz sub-channels could be different than those in the format of the legacy beacon 206 (FIG. 2).

Figure 6:
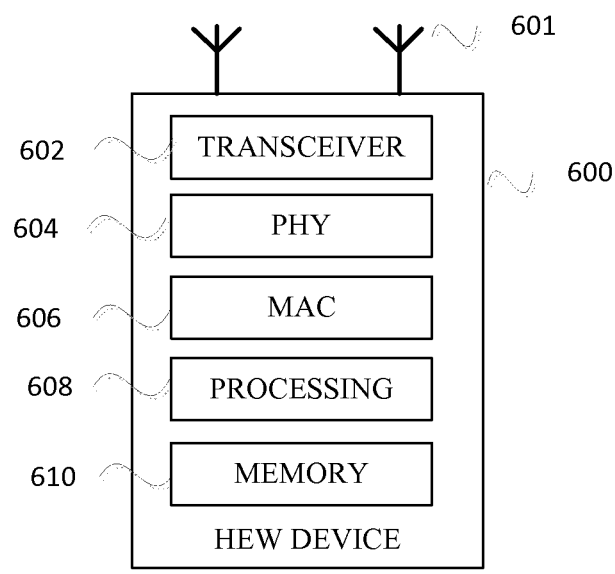
FIG. 6 illustrates a HEW device in accordance with some embodiments.

FIG. 6 illustrates a HEW device in accordance with some embodiments. HEW device 600 may be an HEW compliant device that may be arranged to communicate with one or more other HEW devices, such as HEW devices 104 (FIG. 1) or access point 102 (FIG. 1) as well as communicate with legacy devices 106 (FIG. 1). HEW devices 104 and legacy devices 106 may also be referred to as HEW stations (STAs) and legacy STAs, respectively. HEW device 600 may be suitable for operating as access point 102 (FIG. 1) or an HEW device 104 (FIG. 1).

In accordance with embodiments, HEW device 600 may include, among other things, a transmit/receive element 601 (for example, an antenna), a transceiver 602, physical layer (PHY) circuitry 604 and medium-access control layer circuitry (MAC) 606. PHY 604 and MAC 606 may be HEW compliant layers and may also be compliant with one or more legacy IEEE 802.11 standards. MAC 606 may be arranged to configure physical layer convergence procedure (PLCP) protocol data units (PPDUs) and arranged to transmit and receive PPDUs, among other things. HEW device 600 may also include other hardware processing circuitry 608 and memory 610 configured to perform the various operations described herein. The processing circuitry 608 may be coupled to the transceiver 602, which may be coupled to the transmit/receive element 601. While FIG. 6 depicts the processing circuitry 608 and the transceiver 602 as separate components, the processing circuitry 608 and the transceiver 602 may be integrated together in an electronic package or chip.

In some embodiments, the MAC 606 may be arranged to contend for a wireless medium during a contention period to receive control of the medium for the HEW control period and configure an HEW PPDU. In some embodiments, the MAC 606 may be arranged to contend for the wireless medium based on channel contention settings, a transmitting power level, and a CCA level.

The PHY 604 may be arranged to transmit the HEW PPDU. The PHY 604 may include circuitry for modulation/demodulation, upconversion/downconversion, filtering, amplification, etc. In some embodiments, the hardware processing circuitry 608 may include one or more processors. The hardware processing circuitry 608 may be configured to perform functions based on instructions being stored in a random access memory (RAM) or read-only memory (ROM), or based on special purpose circuitry. In some embodiments, the hardware processing circuitry 608 may be configured to perform one or more of the functions described herein in conjunction with FIGS. 1-5 such as sending and receiving legacy beacons 206 and HEW beacons 500.

In some embodiments, two or more antennas 601 may be coupled to the PHY 604 and arranged for sending and receiving signals including transmission of the HEW packets. The HEW device 600 may include a transceiver 602 to transmit and receive data such as HEW PPDU and packets that include an indication that the HEW device 600 should adapt the channel contention settings according to settings included in the packet. The memory 610 may store information for configuring the other circuitry to perform operations for configuring and transmitting HEW packets and performing the various operations described herein in conjunction with FIGS. 1-6.

In some embodiments, the HEW device 600 may be configured to communicate using OFDM communication signals over a multicarrier communication channel. In some embodiments, HEW device 600 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the example embodiments is not limited in this respect as they may also be suitable to transmit and/or receive communications in accordance with other techniques and standards. In some embodiments, the HEW device 600 uses 4× symbol duration of 802.11n or 802.11 ac.

In some embodiments, an HEW device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an liquid crystal display (LCD) screen including a touch screen.

The antennas 601 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 601 may be effectively separated to take advantage of spatial diversity and the different channel characteristics that may result.

Although the device 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements 608.

The following examples pertain to further embodiments. Example 1 is a high-efficiency wireless local-area network (HEW) device. The wireless communication device may include circuitry configured to: operate in accordance with orthogonal frequency division multiple access (OFDMA) on a plurality of subchannels and a primary channel; transmit a first beacon on the primary channel to one or more legacy devices; and transmit a second beacon on the plurality of subchannels to one or more HEW devices.

In Example 2, the subject matter of Example 1 can optionally include where the first beacon is also transmitted to the one or more HEW devices.

In Example 3, the subject matter of Examples 1 or 2 can optionally include where the first beacon is an 802.11 legacy beacon and the second beacon is a HEW beacon comprising a capabilities element for high-efficiency (HE) operation.

In Example 4, the subject matter of Example 3 can optionally include where the HEW beacon is configured so that a legacy device does not interpret the HEW beacon.

In Example 5, the subject matter of any of Examples 1-4 can optionally include where the primary channel and the plurality of subchannels are each 20 MHz.

In Example 6, the subject matter of any of Examples 1-5 can optionally include where the circuitry is further configured to: transmit the first beacon on the primary channel with a first periodicity; and transmit the second beacon on the plurality of subchannels with a second periodicity.

In Example 7, the subject matter of Example 6 can optionally include where the circuitry is further configured to: transmit the second beacon on the primary channel with the second periodicity.

In Example 8, the subject matter of any of Examples 1-7 can optionally include where the first beacon and the second beacon are configured in accordance with a same legacy beacon format.

In Example 9, the subject matter of any of Examples 1-8 can optionally include where the HEW device is an access point (AP).

In Example 10, the subject matter of any of Examples 1-9 can optionally include where the HEW device is an access point (AP) and wherein the circuitry is further configured to: transmit a schedule that assigns each of one or more HEW devices to one or more of the plurality of subchannels or the primary channel.

In Example 11, the subject matter of Example 10 can optionally include where the circuitry is further configured to manage legacy devices on the plurality of subchannels and the primary subchannel.

In Example 12, the subject matter of any of Examples 1-11 can optionally include where the circuitry is further configured to operate in accordance with 802.11ax.

In Example 13, the subject matter of any of Examples 1-12 can optionally include memory and a transceiver coupled to the circuitry.

In Example 14, the subject matter of Example 13 can optionally include one or more antennas coupled to the transceiver.

Example 15 is a method for transmitting beacons performed by a wireless local-area network (WLAN) device. The method may include transmitting a first beacon on a primary channel to one or more legacy devices; and transmitting, in accordance with orthogonal frequency division multiple access OFDMA, a second beacon on a plurality of subchannels to one or more high-efficiency WLAN (HEW) devices.

In Example 16, the subject matter of Example 15 can optionally include where the transmitting of the first beacon, in accordance with the OFDMA, further includes transmitting, in accordance with OFDMA, the first beacon on the primary channel to one or more legacy devices and to the one or more HEW devices.

In Example 17, the subject matter of any of Examples 15 or 16 can optionally include where the first beacon is a 802.11 legacy beacon and the second beacon is a HEW beacon.

In Example 18, the subject matter of any of Examples 15-17 can optionally include where the HEW beacon is configured so that a legacy device does not interpret the HEW beacon.

Example 19 is a high-efficiency wireless local-area network (HEW) device. The HEW device including circuitry may be configured to: tune to a primary channel to receive a legacy beacon; receive a schedule on the primary channel, wherein the schedule indicates an assigned subchannel for the HEW device; tune to the assigned subchannel; and receive a HEW beacon on the assigned subchannel.

In Example 20, the subject matter of Example 19 can optionally include where the circuitry is further configured to operate in accordance with orthogonal frequency division multiple access (OFDMA).

In Example 21, the subject matter of any of Examples 19 or 20 can optionally include where the HEW beacon is an 802.11ax beacon.

In Example 22, the subject matter of any of Examples 19-21 can optionally include where the circuitry is further configured to: enter a power saving mode; leave the power saving mode based on a periodicity of HEW beacons; and receive another HEW beacon on the assigned subchannel to synchronize the HEW device with an access point that transmitted the HEW beacon.

In Example 23, the subject matter of any of Examples 19-22 can optionally include memory; a transceiver coupled to the circuitry; and one or more antennas coupled to the transceiver.

Example 24 is a non-transitory computer-readable storage medium that stores instructions for execution by one or more processors to perform operations for transmitting beacons on a high-efficiency wireless local-area network (HEW) device. The operations to configure the wireless device to: transmit a first beacon on a primary channel; and transmit a second beacon on a plurality of subchannels.

In Example 25, the subject matter of Example 24 can optionally include where the operations further configure the wireless device to: transmit the first beacon on a primary channel in accordance with orthogonal frequency division multiple access (OFDMA); and transmit the second beacon on the plurality of subchannels, in accordance with OFDMA, and wherein the first beacon is a 802.11 legacy beacon and the second beacon is a HEW beacon.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) wireless device, the apparatus comprising: memory; and circuitry coupled to the memory, the circuitry configured to:
   configure the HE wireless device to operate in accordance with orthogonal frequency division multiple access (OFDMA) on a plurality of subchannels and a primary channel;
   configure the HE wireless device to transmit a schedule that assigns each of one or more HE wireless devices to one or more of the plurality of subchannels or the primary channel, wherein at least one of the one or more HE wireless devices is assigned to one of the plurality of subchannels;
   configure the HE wireless device to transmit the legacy beacon on the primary channel with a first periodicity to one or more legacy devices and to refrain from transmitting the legacy beacon on the plurality of subchannels; and
   configure the HE wireless device to transmit a HE beacon on the plurality of subchannels to one or more HE wireless devices with a second periodicity, wherein the primary channel is a different 20 MHz subchannel from each of the plurality of subchannels.

2. The apparatus of the HE wireless device of claim 1, wherein the legacy beacon is also transmitted to the one or more HE wireless devices.

3. The apparatus of the HE wireless device of claim 1, wherein the HE beacon is configured so that a legacy device does not interpret the HE beacon.

4. The apparatus of the HE wireless device of claim 1, wherein the primary channel and the plurality of subchannels are each 20 MHz.

5. The apparatus of the HE wireless device of claim 1, wherein the legacy beacon and the HE beacon are configured in accordance with a same legacy beacon format.

6. The apparatus of the HE wireless device of claim 1, wherein the HE wireless device is an access point (AP).

7. The apparatus of the HE wireless device of claim 1, wherein the circuitry is further configured to manage legacy devices on the plurality of subchannels and the primary subchannel.

8. The apparatus of the HE wireless device of claim 1, further comprising transceiver circuitry coupled to the circuitry.

9. The apparatus of the HE wireless device of claim 8, further comprising one or more antennas coupled to the transceiver circuitry.

10. A method for transmitting beacons performed by an apparatus of a high efficiency (HE) device, the method comprising:
   transmitting a legacy beacon on the primary channel to one or more legacy devices;
   transmitting a schedule that assigns each of one or more HE wireless devices to one or more of the plurality of subchannels or the primary channel, wherein at least one of the one or more HE wireless devices is assigned to one of the plurality of subchannels;
   transmitting the legacy beacon on the primary channel with a first periodicity and refraining from transmitting the legacy beacon on the plurality of subchannels; and
   transmitting, in accordance with orthogonal frequency division multiple access (OFDMA), a HE beacon on the plurality of subchannels to one or more HE wireless devices with a second periodicity, wherein the primary channel is a different 20 MHz subchannel from each of the plurality of subchannels.

11. The method of claim 10, wherein the HE beacon is configured so that a legacy device does not interpret the HE beacon.

12. An apparatus of a high-efficiency (HE) wireless device, the apparatus comprising: memory; and circuitry coupled to the memory, the circuitry configured to:
   configure the HE wireless device to tune to a primary channel to receive a legacy beacon;
   configure the HE wireless device to receive a schedule on the primary channel, wherein the schedule indicates an assigned subchannel for the HE wireless device;
   configure the HE wireless device to tune to the assigned subchannel;
   configure the HE wireless device to receive a HE beacon on the assigned subchannel;
   configure the HE wireless device to enter a power saving mode;
   configure the HE wireless device to leave the power saving mode based on a periodicity of HE beacons; and
   configure the HE wireless device to receive another HE beacon on the assigned subchannel to synchronize the HE device with an access point that transmitted the HE beacon.

13. The apparatus of the HE wireless device of claim 12, wherein the circuitry is further configured to operate in accordance with orthogonal frequency division multiple access (OFDMA).

14. The apparatus of the HE wireless device of claim 12, wherein the HE beacon is an 802.11ax beacon.

15. The apparatus of the HE wireless device of claim 12, further comprising: a transceiver coupled to the circuitry; and one or more antennas coupled to the transceiver.

16. A non-transitory computer-readable storage medium that stores instructions for execution by one or more processors to perform operations on an apparatus of a high-efficiency (HE) wireless device for transmitting beacons on a high-efficiency (HE) wireless device, the operations to configure the HE wireless device to:
   transmit a legacy beacon on the primary channel to one or more legacy devices;
   transmit a schedule that assigns each of one or more HE wireless devices to one or more of the plurality of subchannels or the primary channel, wherein at least one of the one or more HE wireless devices is assigned to one of the plurality of subchannels;
   transmit the legacy beacon on the primary channel with a first periodicity and refrain from transmitting the legacy beacon on the plurality of subchannels; and
   transmit a HE beacon on the plurality of subchannels to one or more HE wireless devices with a second periodicity, wherein the primary channel is a different 20 MHz subchannel from each of the plurality of subchannels.

17. The non-transitory computer-readable storage medium of claim 16, wherein the operations further configure the apparatus of the HE wireless device to:
   transmit the legacy beacon on a primary channel in accordance with orthogonal frequency division multiple access (OFDMA); and
   transmit the HE beacon on the plurality of subchannels, in accordance with OFDMA, and wherein the legacy beacon is a Institute of Electronic and Electrical Engineers (IEEE) 802.11 a/b/g/n/ac legacy beacon and the HE beacon is a HE beacon comprising a capabilities element for HE operation.

18. The apparatus of the HE wireless device of claim 1, wherein the memory is configured to store the legacy beacon.

19. The apparatus of the HE wireless device of claim 12, wherein the memory is configured to store the schedule.

* * * * *